US 9,118,234 B2

(12) United States Patent
Tsukamoto et al.

(10) Patent No.: US 9,118,234 B2
(45) Date of Patent: Aug. 25, 2015

(54) STATOR, MOTOR, AND COMPRESSOR (75) Inventors: Satoshi Tsukamoto, Kusatsu (JP);
Hiroki Shirasaka, Kusatsu (JP);
Yoshinori Kagawa, Kusatsu (JP);
Seiichi Murakami, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 124 days.

(21) Appl. No.: 13/147,247

(22) PCT Filed: Jan. 22, 2010

(86) PCT No.: PCT/JP2010/050781
§ 371 (c)(1),
(2), (4) Date: Aug. 1, 2011

(87) PCT Pub. No.: WO2010/090082
PCT Pub. Date: Aug. 12, 2010

(65) Prior Publication Data
US 2011/0285240 A1    Nov. 24, 2011

(30) Foreign Application Priority Data

Feb. 3, 2009 (JP) ................. 2009-022161

(51) Int. Cl.
*H02K 3/38* (2006.01)
*H02K 3/52* (2006.01)
*H02K 15/12* (2006.01)
*H02K 1/18* (2006.01)
*H02K 7/14* (2006.01)

(52) U.S. Cl.
CPC ............. *H02K 3/522* (2013.01); *H02K 15/12* (2013.01); *H02K 1/185* (2013.01); *H02K 7/14* (2013.01); *H02K 2203/06* (2013.01)

(58) Field of Classification Search
CPC ..... H02K 3/345; H02K 2203/12; H02K 3/34; H02K 3/522; H02K 15/12; H02K 1/185; H02K 2203/06; H02K 7/14
USPC .................................................. 310/91, 215
See application file for complete search history.

(56) References Cited

U.S. PATENT DOCUMENTS

| 5,774,974 A | * | 7/1998 | Dunfield et al. | ................. 29/596 |
| 5,808,379 A | * | 9/1998 | Zhao | ........................... 310/12.24 |
| 5,996,209 A | * | 12/1999 | Molnar et al. | .................. 29/596 |

(Continued)

FOREIGN PATENT DOCUMENTS

| JP | 2002-330565 A | 11/2002 |
| JP | 2005-287240 A | 10/2005 |

(Continued)

OTHER PUBLICATIONS

International Preliminary Report of corresponding PCT Application No. PCT/JP2010/050781.
International Search Report of corresponding PCT Application No. PCT/JP2010/050781.

(Continued)

*Primary Examiner* — Alex W Mok
(74) *Attorney, Agent, or Firm* — Global IP Counselors (57) ABSTRACT

A stator includes a core and an insulator. The core has a plurality of annularly arranged tooth portions. The insulator is disposed on an end portion of the core, and has an annular wall portion extending in a direction departing from the core. A protrusion protrudes radially outward across an entire circumference of the wall portion, and the protrusion is provided on an outer circumferential surface of the wall portion.

20 Claims, 12 Drawing Sheets

(56) References Cited

U.S. PATENT DOCUMENTS

| | | | |
|---|---|---|---|
| 7,880,360 B2* | 2/2011 | Yamawaki et al. | 310/215 |
| 2005/0052086 A1* | 3/2005 | Miya et al. | 310/71 |
| 2007/0046136 A1* | 3/2007 | Higashino et al. | 310/260 |
| 2007/0222324 A1* | 9/2007 | Fukui et al. | 310/215 |
| 2008/0018185 A1* | 1/2008 | Oohashi et al. | 310/71 |
| 2009/0267442 A1* | 10/2009 | Yamawaki et al. | 310/215 |
| 2010/0074774 A1 | 3/2010 | Kojima et al. | |
| 2010/0096945 A1 | 4/2010 | Tsukamoto et al. | |

FOREIGN PATENT DOCUMENTS

| | | | |
|---|---|---|---|
| JP | 2006097517 A | * | 4/2006 |
| JP | 2008184931 A | * | 8/2008 |
| WO | WO-2008/065802 A1 | | 6/2008 |
| WO | WO-2008/102721 A1 | | 8/2008 |

OTHER PUBLICATIONS

Office Action of corresponding Japanese Application No. 2009-022161 dated Mar. 16, 2010.

* cited by examiner

STATOR, MOTOR, AND COMPRESSOR

CROSS-REFERENCE TO RELATED APPLICATIONS

This U.S. National stage application claims priority under 35 U.S.C. §119(a) to Japanese Patent Application No. 2009-022161, filed in Japan on Feb. 3, 2009, the entire contents of which are hereby incorporated herein by reference.

TECHNICAL FIELD

The present invention relates to a stator of a motor used in industrial equipment, office equipment, equipment for household electrical appliances, and the like, and a motor and a compressor to each of which this stator is applied.

BACKGROUND ART

Conventionally, as a synchronous motor incorporated in, and functioning as a part of, a motor-integrated hydraulic pump which is mounted on a motor vehicle or the like, there has been known a synchronous motor which is provided adjacent to a pump in a casing (see Japanese Unexamined Patent Publication No. 2005-287240). As described in the patent document 1, the motor is constituted as a three-phase brushless motor, and has: a stator having coils respectively wound, via an insulator, around a plurality of teeth formed in a core; and a rotor provided with a magnet.

SUMMARY

Incidentally, processes for such a conventional synchronous motor generally include a process of impregnating a stator with varnish or a process of directly applying varnish to the stator. After wiping varnish attached to an end surface of a core using waste or the like, the stator thus processed with varnish is subjected to a drying process for drying varnish, with the stator being placed upright or horizontally relative to a mounting surface.

However, in spite of the fact that the varnish has been wiped by a wiping operation conducted before the drying process, there may be a case where, for example, excess varnish runs down to and attaches to the end surface of the core in the drying process. This case presented a problem that it is not possible to precisely position the stator in a process of installing the stator into a casing using shrink fitting or the like because, for example, the stator loses its balance and is thereby inclined obliquely.

An object of the present invention is to provide a stator, a motor, and a compressor each of which is capable of achieving precise positioning of the stator in the process of installing the stator into a casing.

Solution to Problem

A stator of a first aspect of the invention includes: a core having a plurality of tooth portions arranged annularly; and an insulator which is disposed on an end portion of the core and has an annular wall portion extending in a direction departing from the core, and in this stator, a protrusion protruding radially outward across an entire circumference of the wall portion is provided on an outer circumferential surface of the wall portion.

In this stator, the protrusion protruding radially outward across the entire circumference of the wall portion is provided on the outer circumferential surface of the wall portion. Thereby, in a process of drying varnish with the stator being placed upright relative to a mounting surface (hereinafter referred to as an "upright position drying process"), excess varnish is prevented from running down to and attaching to an end surface of the core with respect to all directions. Consequently, this prevents the stator from losing its balance in a process of installing the stator into a casing using shrink fitting or the like, and thereby precise positioning of the stator is achieved.

A stator of a second aspect of the invention is the stator of the first aspect, in which a groove formed at a position apart from an outer edge of the protrusion is provided on at least a part of a surface of the protrusion, which surface is on an opposite side of the protrusion from the core.

With this stator, excess varnish is retained in the groove formed at the position apart from the outer edge of the protrusion, in the upright position drying process. This further ensures that the excess varnish is prevented from running down to and attaching to the end surface of the core.

A stator of a third aspect of the invention is the stator of the first or second aspect, in which the protrusion is provided so that a gap is created between at least a part of the protrusion and the end portion of the core.

In this stator, a gap is created between at least a part of the protrusion and the end portion of the core. Thereby, in a process of drying varnish with the stator being placed horizontally relative to the mounting surface (hereinafter referred to as a "horizontal position drying process"), the excess varnish drops from a position before the end surface of the core toward the mounting surface of the stator, before the varnish reaches the end surface. Accordingly, the excess varnish is prevented from attaching to the end surface of the core.

Furthermore, in this stator, the size of the interface area between the insulator and the core is smaller, which leads to a decrease in an amount of varnish entering into the interface area in a varnishing process of the stator. Accordingly, it is possible to decrease an amount of varnish leaking out of the interface area to the end surface of the core after a wiping operation of varnish attached to the end surface of the core. This results in a decrease in an amount of varnish attached to the end surface of the core in the upright position drying process or the horizontal position drying process.

A stator of a fourth aspect of the invention is the stator of the third aspect in which the protrusion is provided so that a gap is created across an entire circumference of the protrusion and between the protrusion and the end portion of the core.

This stator further ensures that excess varnish is prevented from attaching to the end surface of the core, in the horizontal position drying process. In addition, this stator achieves minimization of an amount of varnish attached to the end surface of the core in the upright position drying process or the horizontal position drying process.

A stator of a fifth aspect of the invention is the stator of the third aspect, in which: recesses along an axial direction of the core are formed at respective portions of an outer circumferential surface of the core which correspond to the plurality of tooth portions; and the protrusion is provided so that gaps are created at respective positions corresponding to portions between the tooth portions and each of the gaps is situated between a part of the protrusion and the end portion of the core.

This stator allows, in the horizontal position drying process, excess varnish to drop toward the mounting surface of the stator from a position before a corresponding one of portions of the outer circumferential surface of the core which respectively correspond to the portions between the tooth portions (before a corresponding bulging portion of the core which portion contacts an inner circumferential surface of the casing when the stator is installed into the casing using shrink fitting or the like) before the varnish reaches the bulging portion. Moreover, this stator achieves minimization of an amount of varnish attached to one or more bulging portions in the upright position drying process or the horizontal position drying process.

A stator of a sixth aspect of the invention is the stator of any of the first to fifth aspects, in which a projection protruding radially outward is formed on an edge surface of the protrusion.

In this stator, excess varnish is guided from the projection to the mounting surface of the stator in the horizontal position drying process, and this further ensures that the excess varnish is prevented from attaching to the end surface of the core. Moreover, in this stator, the projection functions as a barrier, thereby preventing the excess varnish from running down to and attaching to the end surface of the core, also in the upright position drying process.

A stator of a seventh aspect of the invention is the stator of the sixth aspect, in which the projection is a parting line formed across an entire circumference of the edge surface of the protrusion.

In this stator, a parting line, which is a portion where mold parts match up and is formed when the insulator is molded, is used as the projection.

A motor of an eighth aspect of the invention includes: the stator of any of the first to seventh aspects; and a rotor disposed inside the core.

This motor brings about advantageous effects similar to those of the stator of the first to seventh aspects.

A compressor of a ninth aspect of the invention includes the motor of the eighth aspect.

This compressor brings about advantageous effects similar to those of the motor of the eighth aspect.

Advantageous Effects Of Invention

As hereinabove stated, the present invention brings about the following advantageous effects.

In the first aspect of the invention, the protrusion protruding radially outward across the entire circumference of the wall portion is provided on the outer circumferential surface of the wall portion. Thereby, in the upright position drying process, excess varnish is prevented from running down to and attaching to the end surface of the core with respect to all directions. Consequently, this prevents the stator from losing its balance in the process of installing the stator into the casing using shrink fitting or the like, and thereby precise positioning of the stator is achieved.

In the second aspect of the invention, excess varnish is retained in the groove formed at the position apart from the outer edge of the protrusion, in the upright position drying process. This further ensures that the excess varnish is prevented from running down to and attaching to the end surface of the core.

In the third aspect of the invention, a gap is created between at least a part of the protrusion and the end portion of the core. This allows, in the horizontal position drying process, the excess varnish to drop from a position before the end surface of the core toward the mounting surface of the stator, before the varnish reaches the end surface. Accordingly, the excess varnish is prevented from attaching to the end surface of the core.

Furthermore, in the third aspect of the invention, the size of the interface area between the insulator and the core is smaller, which leads to a decrease in an amount of varnish entering into the interface area in a varnishing process of the stator. Accordingly, it is possible to decrease an amount of varnish leaking out of the interface area after a wiping operation of varnish attached to the end surface of the core. This results in a decrease in an amount of varnish attached to the end surface of the core in the upright position drying process or the horizontal position drying process.

In the fourth aspect of the invention, it is further ensured that excess varnish is prevented from attaching to the end surface of the core, in the horizontal position drying process. In addition, this stator achieves minimization of an amount of varnish attached to the end surface of the core in the upright position drying process or the horizontal position drying process.

In the fifth aspect of the invention, excess varnish drops, in the horizontal position drying process, toward the mounting surface of the stator from a position before a corresponding one of portions of the outer circumferential surface of the core which respectively correspond to the portions between the tooth portions (before a corresponding bulging portion of the core which portion contacts an inner circumferential surface of the casing when the stator is installed into the casing using shrink fitting or the like) before the varnish reaches the bulging portion. Moreover, this stator achieves minimization of an amount of varnish attached to one or more bulging portions in the upright position drying process or the horizontal position drying process.

In the sixth aspect of the invention, excess varnish is guided from the projection to the mounting surface of the stator in the horizontal position drying process, and this further ensures that the excess varnish is prevented from attaching to the end surface of the core. Moreover, in this stator, the projection functions as a barrier, thereby preventing the excess varnish from running down to and attaching to the end surface of the core, also in the upright position drying process.

In the seventh aspect of the invention, a parting line, which is a portion where mold parts match up and is formed when the insulator is molded, is used as the projection.

In the eighth aspect of the invention, there are provided advantageous effects similar to those of the stator of the first to seventh aspects.

In the ninth aspect of the invention, there are provided advantageous effects similar to those of the motor of the eighth aspect.

DESCRIPTION OF EMBODIMENTS (First Embodiment)

The following describes a first embodiment of a stator, a motor, and a compressor, in accordance with the present invention.

<Overall Structure of Scroll Compressor>

Figure 1:
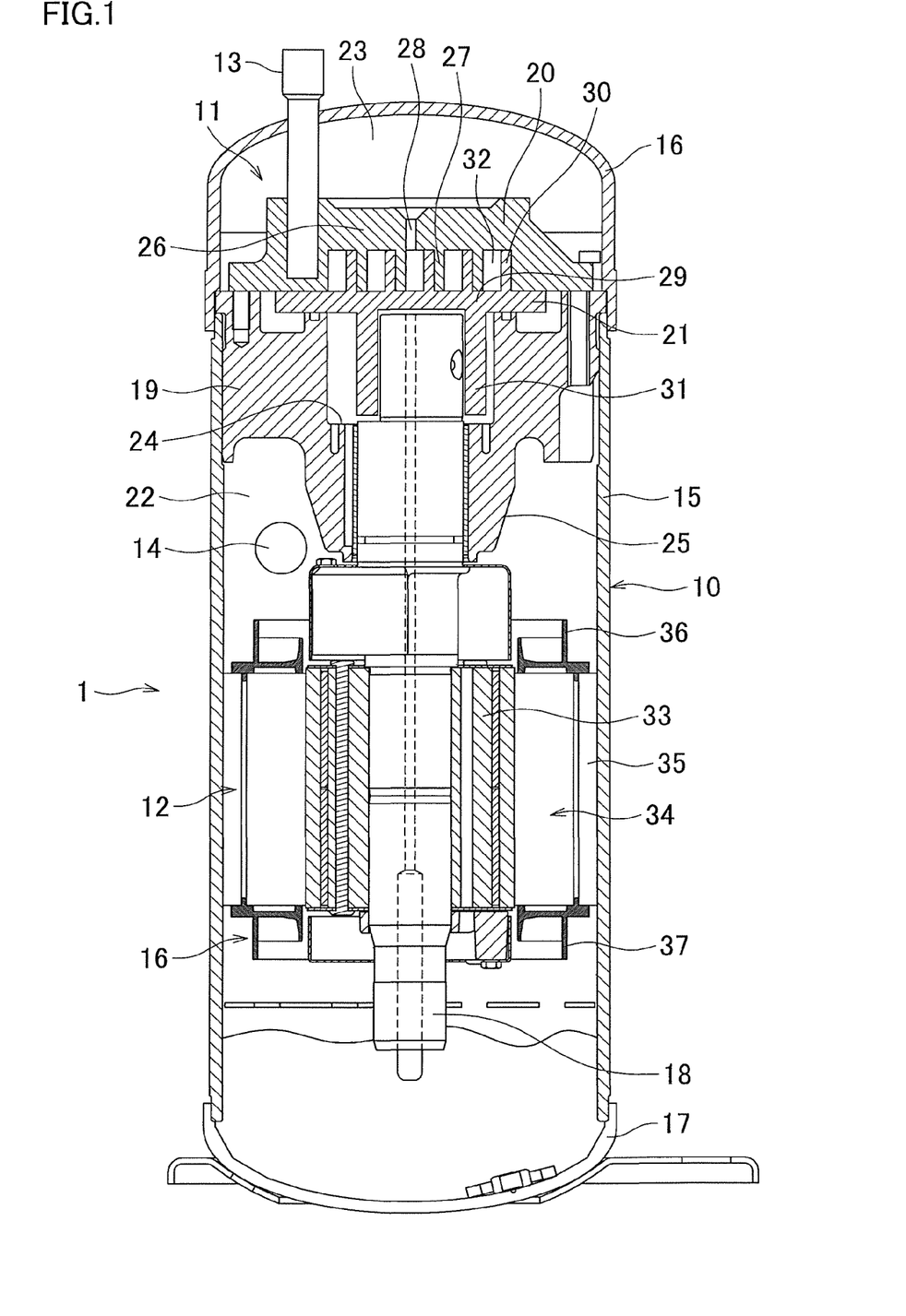
FIG. 1 is a sectional view illustrating a scroll compressor of a first embodiment of the present invention.
Figure 2:
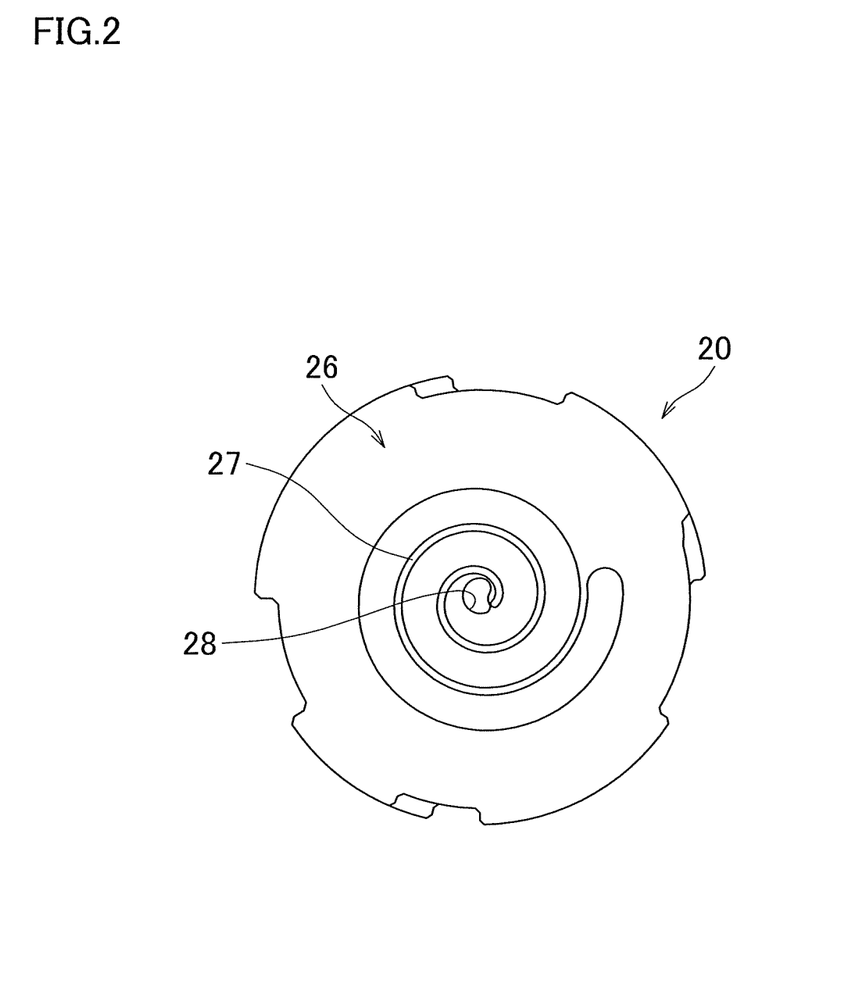
FIG. 2 is a plan view illustrating a fixed scroll member.

FIG. 1 is a sectional view illustrating a scroll compressor 1 (compressor) of the first embodiment of the present invention. FIG. 2 is a plan view illustrating a fixed scroll member 20 which will be described later. The scroll compressor 1 constitutes a refrigerant circuit, together with an evaporator, a condenser, an expansion valve, and the like, and functions to compress a gas refrigerant in the refrigerant circuit. The scroll compressor 1 is constituted by a generally cylindrical casing 10 of hermetic dome type, a scroll compression mechanism 11, a motor 12, an intake pipe 13, a discharge pipe 14, and the like. Hereinafter, details on these main components will be described.

<Casing>

The casing 10 has a substantially cylindrical casing body 15, a bowl-like top wall portion 16 airtightly welded to an upper end portion of the casing body 15, and a bowl-like bottom wall portion 17 airtightly welded to a lower end portion of the casing body 15. In addition, the casing 10 contains therein the scroll compression mechanism 11 which compresses the gas refrigerant, and the motor 12 which is disposed below the scroll compression mechanism 11. The scroll compression mechanism 11 and the motor 12 are connected to each other by a drive shaft 18 disposed so as to extend in an up and down direction in the casing 10.

<Scroll Compression Mechanism>

As shown in FIG. 1, the scroll compression mechanism 11 is constituted by: a housing 19; a fixed scroll member 20 which is disposed above the housing 19 so as to be in close contact with the housing 19; and a movable scroll member 21 which meshes with the fixed scroll member 20. Hereinafter, details on these components will be described.

<Housing>

The housing 19 is press-fit into and fixed to the casing body 15 in such a manner that a fit is achieved on an outer circumferential surface of the housing 19 and across an entire circumference of the housing 19. In other words, the casing body 15 is in close contact with the housing 19 across the entire circumference of the housing 19. Therefore, the inside of the casing 10 is partitioned into a high-pressure space 22 which is below the housing 19 and a low-pressure space 23 which is above the housing 19. The housing 19 is fixed to the fixed scroll member 20 via a bolt member so that an upper end surface of the housing 19 is in close contact with a lower end surface of the fixed scroll member 20. In addition, the housing 19 has: a housing recess 24 provided in a recessed manner at a center of a top surface of the housing 19; and a bearing portion 25 provided so as to extend downward from a center of an under surface of the housing 19.

<Fixed Scroll Member>

As shown in FIG. 1, the fixed scroll member 20 is constituted by an end plate 26, and a spiral wrap 27 extending downward from a surface of the end plate 26. As shown in FIG. 2, a discharge hole 28 communicating with a later-described compress chamber 32 is formed in a central portion of the end plate 26.

<Movable Scroll Member>

As shown in FIG. 1, the movable scroll member 21 is constituted by: in the same way as the fixed scroll member 20, an end plate 29; a spiral wrap 30 extending upward from a surface of the end plate 29; and a boss portion 31 extending downward from an under surface of the end plate 29. Into the boss portion 31, an upper end of the drive shaft 18 is fitted. The movable scroll member 21 installed in the scroll compression mechanism 11 does not rotate along with the rotation of the drive shaft 18, but revolves in the housing 19 independently of that rotation.

As shown in FIG. 1, the wrap 30 of the movable scroll member 21 meshes with the wrap 27 of the fixed scroll member 20, and thereby a compress chamber 32 is formed between these wraps. The compress chamber 32 is moved toward a center as the movable scroll member 21 revolves, causing a reduction in the capacity of the compress chamber 32. As a result of this reduction, a gas refrigerant in the compress chamber 32 is compressed.

<Intake Pipe and Discharge Pipe>

The intake pipe 13 is for inducing a refrigerant in the refrigerant circuit into the scroll compression mechanism 11, and is airtightly inserted through the top wall portion 16 of the casing 10. The intake pipe 13 penetrates the low-pressure space 23 in the up and down direction, and an inner end portion of the intake pipe 13 is inserted into the fixed scroll member 20. On the other hand, the discharge pipe 14 is for discharging a refrigerant inside the casing 10 to the outside of the casing 10, and is airtightly inserted through the casing body 15 of the casing 10.

<Motor>

The motor 12 has a rotor 33 (rotor) connected to the movable scroll member 21 via the drive shaft 18, and a stator 34 (stator) disposed radially outside of the rotor 33 with an air gap interposed therebetween. The stator 34 has a core 35, insulators 36 and 37 respectively disposed on upper and lower end portions of the core 35, and later-described coils 76 to 84 (see FIGS. 5 and 6). The insulators 36 and 37 are formed to into a substantially same shape. Hereinafter, the structure of the insulator 36 will be described in detail.

<Insulator>

Figure 3:
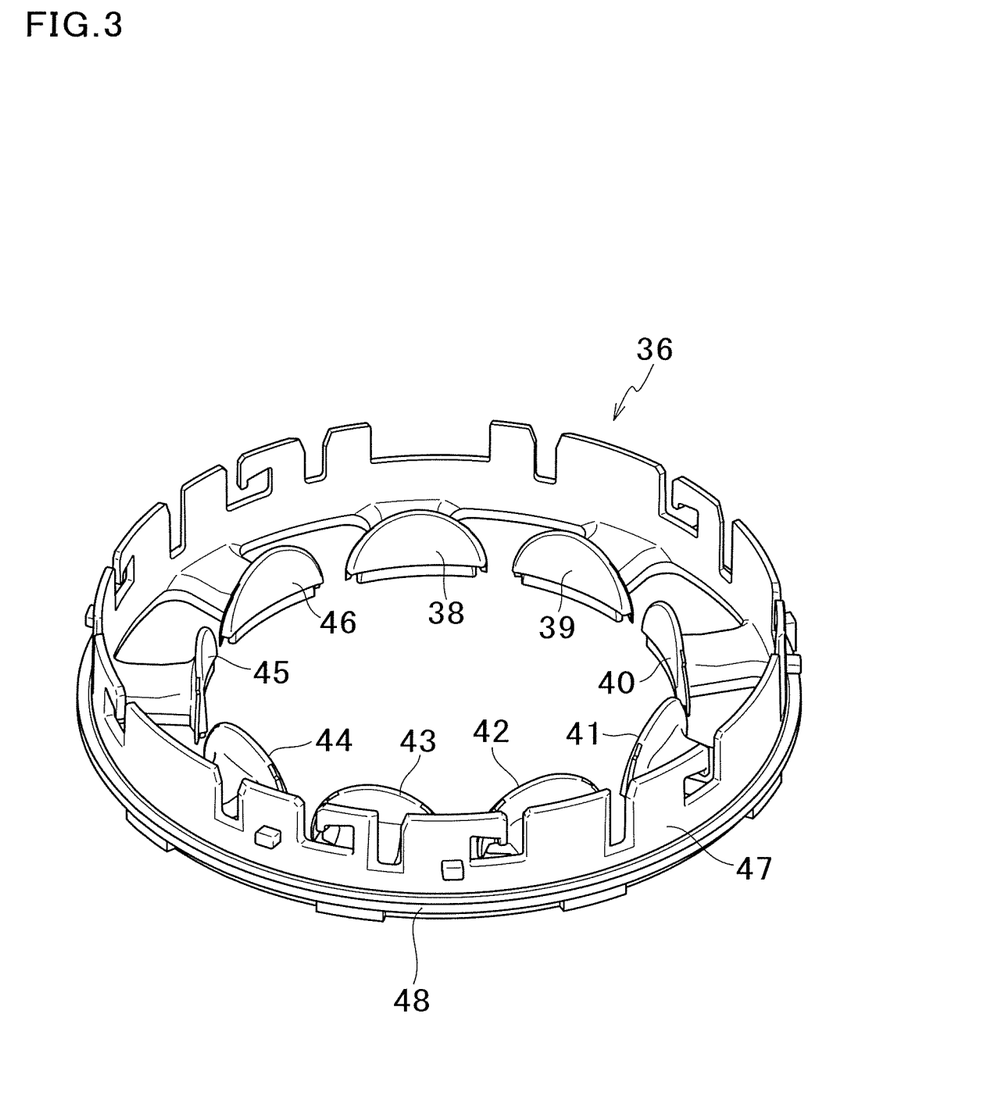
FIG. 3 is a perspective view of an insulator.
Figure 4:
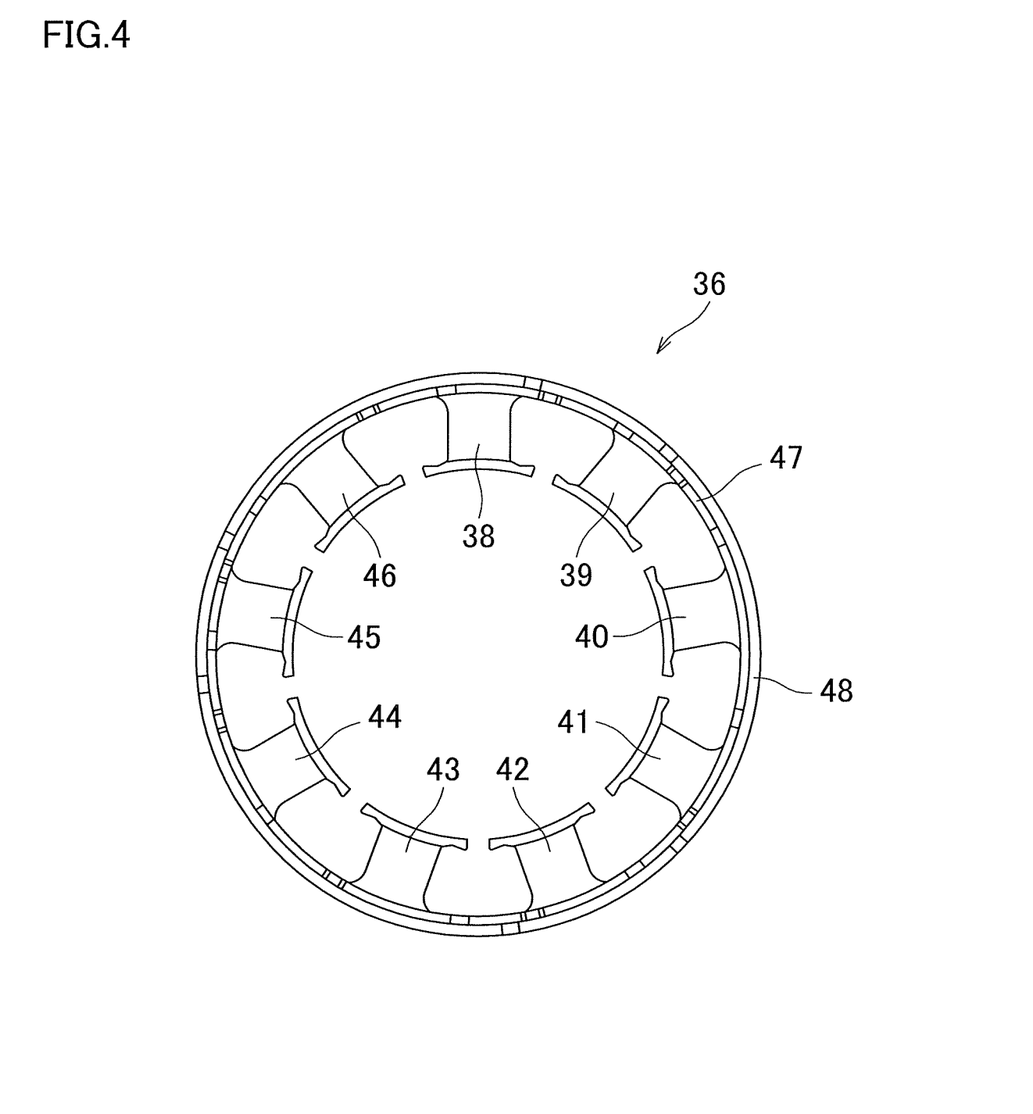
FIG. 4 is a top view of the insulator.

FIG. 3 is a perspective view of the insulator 36. FIG. 4 is a top view of the insulator 36. As shown in these figures, the insulator 36 has annularly arranged nine inner wall portions 38 to 46 each of which protrudes radially inward and has a substantially semicircular shape. As shown in FIG. 4, the inner wall portions 38 to 46 are formed into a substantially same shape.

As shown in FIG. 3, the insulator 36 also has an annular wall portion 47 extending upward (in a direction departing from the core 35 shown in FIG. 1) and formed radially outside of the inner wall portions 38 to 46. As shown in FIG. 3, on the wall portion 47, there is provided a protrusion 48 protruding radially outward across the entire circumference of the wall portion 47.

<Stator>

Figure 5:
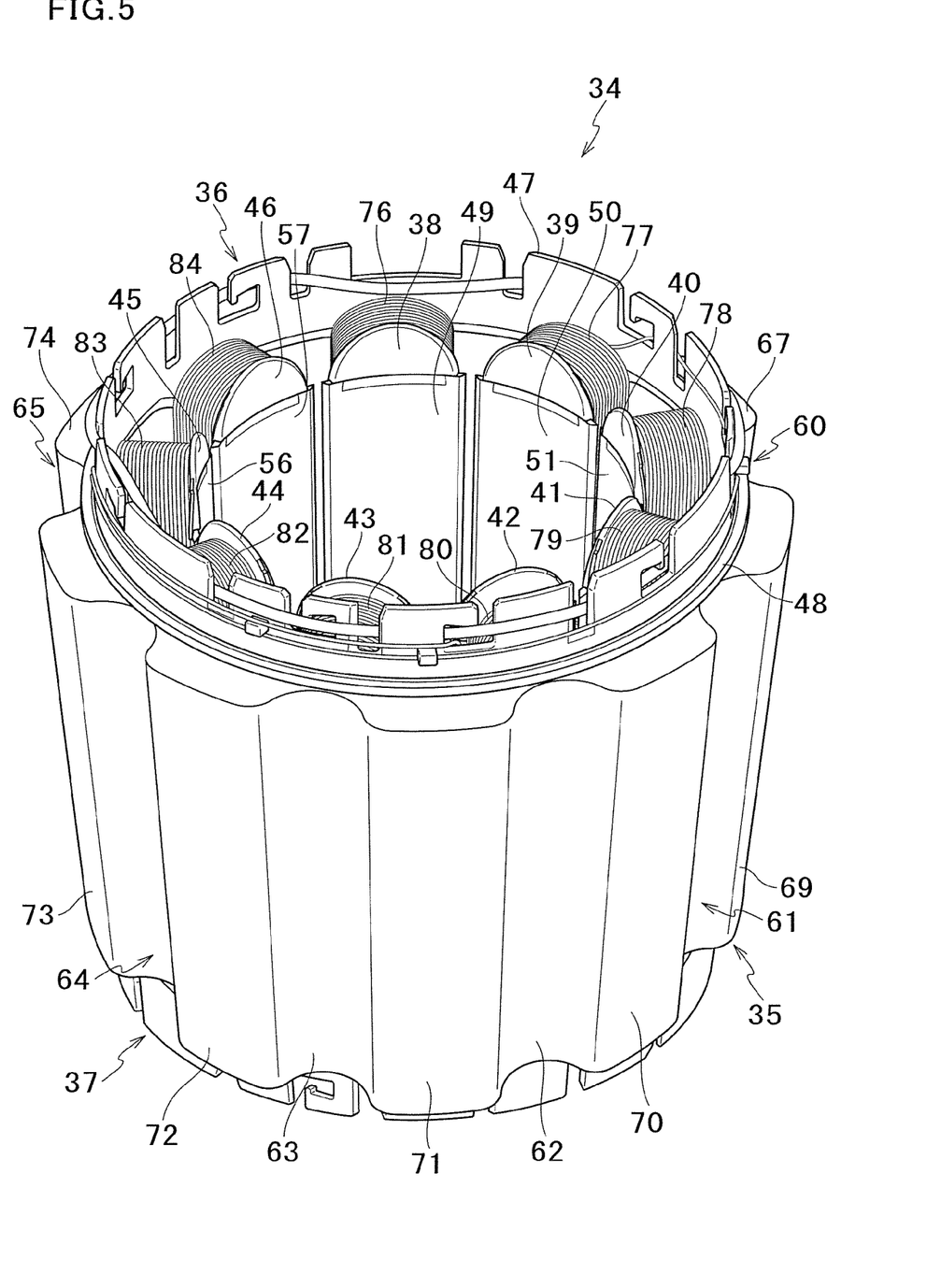
FIG. 5 is a perspective view of a stator.
Figure 6:
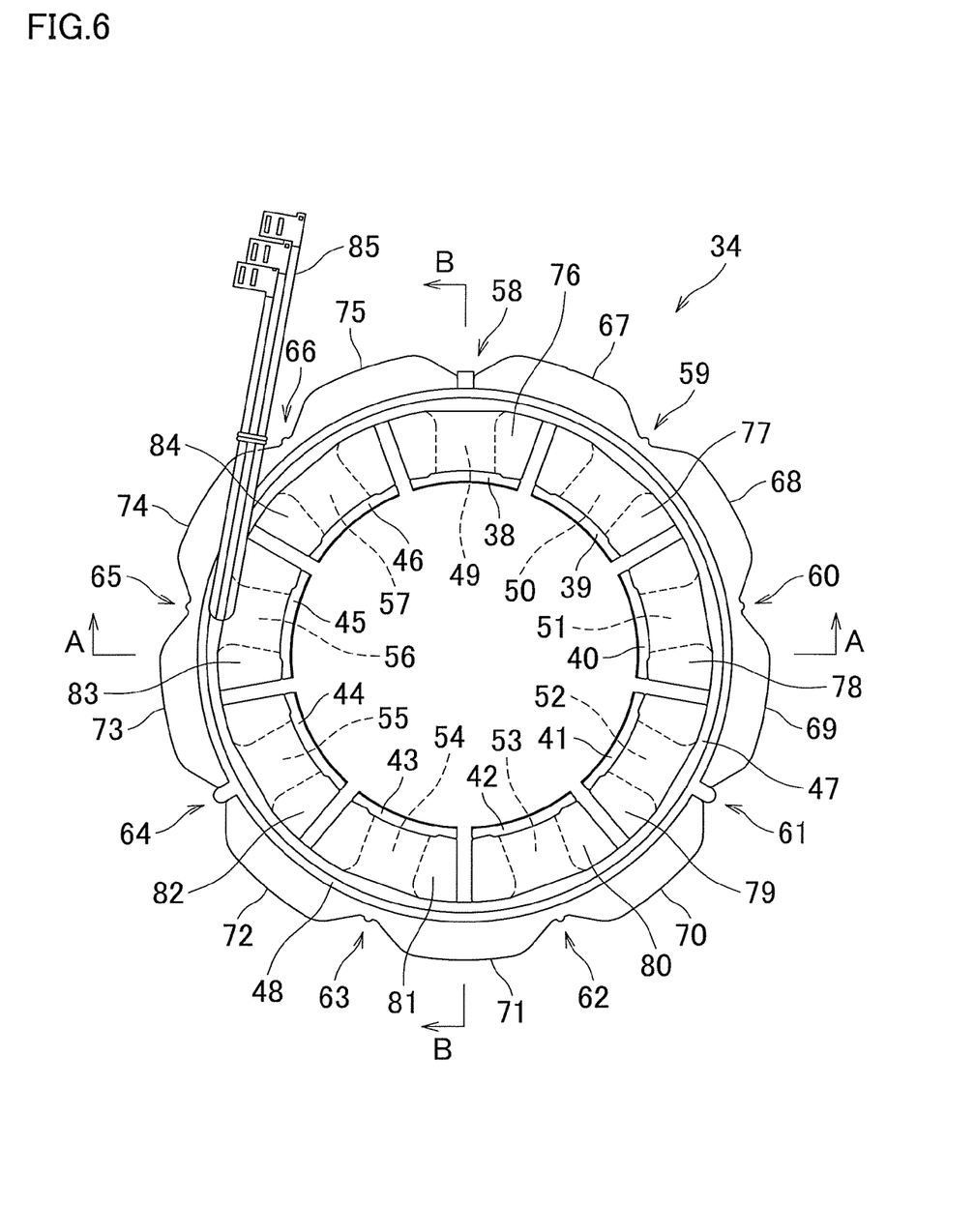
FIG. 6 is a top view of the stator.

FIG. 5 is a perspective view of the stator 34. FIG. 6 is a top view of the stator 34. Note that in FIG. 5, lead wires 85 which will be described later are omitted. As shown in FIGS. 5 and 6, the stator 34 has annularly arranged nine teeth 49 to 57 (tooth portions) each of which protrudes radially inward (inward with respect to a radial direction of the core 35). In addition, on an outer circumferential surface of the core 35, nine recesses 58 to 66, each formed by cutting the core 35 along an axial direction thereof, and nine bulging portions to 75 are formed alternately with one another in a circumferential direction.

Note that, each of the recesses 58 to 66 is a portion which does not contact an inner circumferential surface of the casing 10 when the core 35 is installed into the casing 10 using shrink fitting or the like. As shown in FIG. 6, the recesses 58 to 66 are formed at respective positions of the outer circumference of the core 35 which correspond to the teeth 49 to 57 respectively.

On the other hand, each of the bulging portions 67 to 75 is a portion which contacts the inner circumferential surface of the casing 10 when the core 35 is installed into the casing 10, and is provided so as to correspond to a portion between teeth. Specifically, as shown in FIG. 6, the bulging portions 67 to 75 are formed at positions corresponding to portions between: the teeth 49 and 50; the teeth 50 and 51; the teeth 51 and 52; the teeth 52 and 53; the teeth 53 and 54; the teeth 54 and 55; the teeth 55 and 56; the teeth 56 and 57; and the teeth 49 and 57, respectively.

As illustrated with dashed lines in FIG. 6, the teeth 49 to 57 are formed into a substantially same shape. Together with the associated inner wall portions 38 to 46 (see FIG. 4) of the insulator 36, the teeth 49 to 57 are respectively wound with coils 76 to 84 (wires).

As shown in FIG. 6, three lead wires 85 for receiving power from the outside are connected to the wound coils 76 to 84, and thereby three-phase control (phases U V, and W) is performed.

Figure 7:
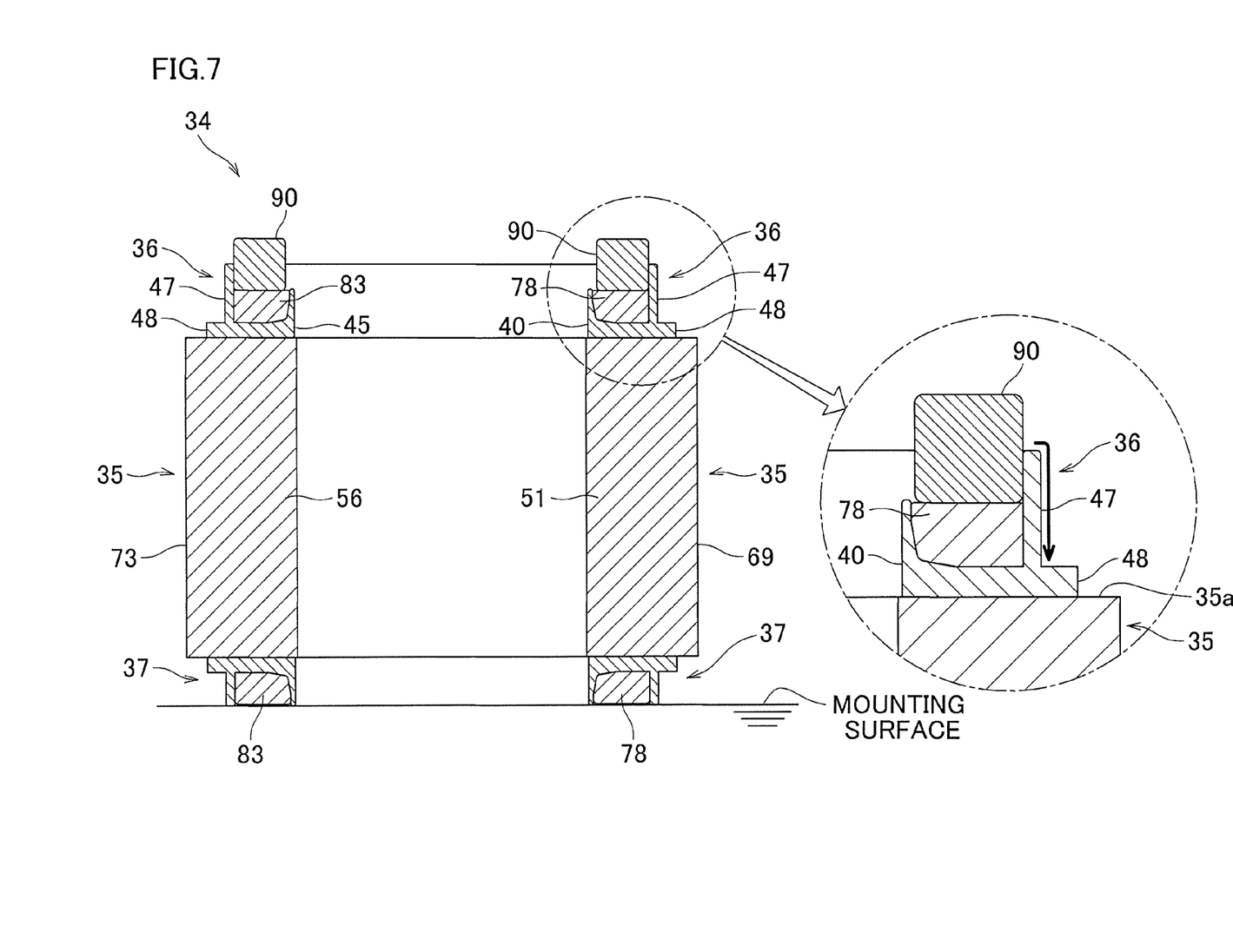
FIG. 7 is an explanatory diagram illustrating an upright position drying process.

FIG. 7 is a cross sectional view taken along line A-A shown in FIG. 6, and an explanatory diagram illustrating an upright position drying process. As shown in FIG. 7, above the coils 78 and 83, there are provided: the lead wires; wires extended from the respective coils 76 to 84; and connection points 90 each providing electrical connection between each lead wire and an extended wire associated therewith.

A bold arrow illustrated in an enlarged view of a portion encircled by an alternate long and short dash line (a portion in the vicinity of the coil 78) in FIG. 7 shows a flow of excess varnish attached to the insulator 36 or a connection point 90 in the varnishing process. As shown with this arrow, the excess varnish runs via an upper end portion of the wall portion 47 of the insulator 36 and heads toward an end surface 35a of the core 35, however, the protrusion 48 formed across the entire circumference of the wall portion 47 functions as a barrier and thereby blocks the flow. Accordingly, the excess varnish fails to reach the end surface 35a of the core 35. Furthermore, since the protrusion 48 is formed across the entire circumference of the outer circumferential surface of the wall portion 47, excess varnish is prevented from running down to and attaching to the end surface 35a of the core 35 with respect to all directions, compared to a case where the protrusion 48 is formed on only a part of the outer circumferential surface.

[Characteristics of Compressor of This Embodiment]

The scroll compressor 1 of this embodiment has the following characteristics.

In the scroll compressor 1 of this embodiment, excess varnish attached to the insulator 36 is prevented from running down to and attaching to the end surface 35a of the core 35, in the upright position drying process. Consequently, this prevents the stator 34 from losing its balance as a result that, for example, the stator 34 is inclined, in a process of installing the stator 34 into the casing 10 using shrink fitting or the like, and thereby precise positioning of the stator 34 is achieved.

(Second Embodiment)

Figure 8:
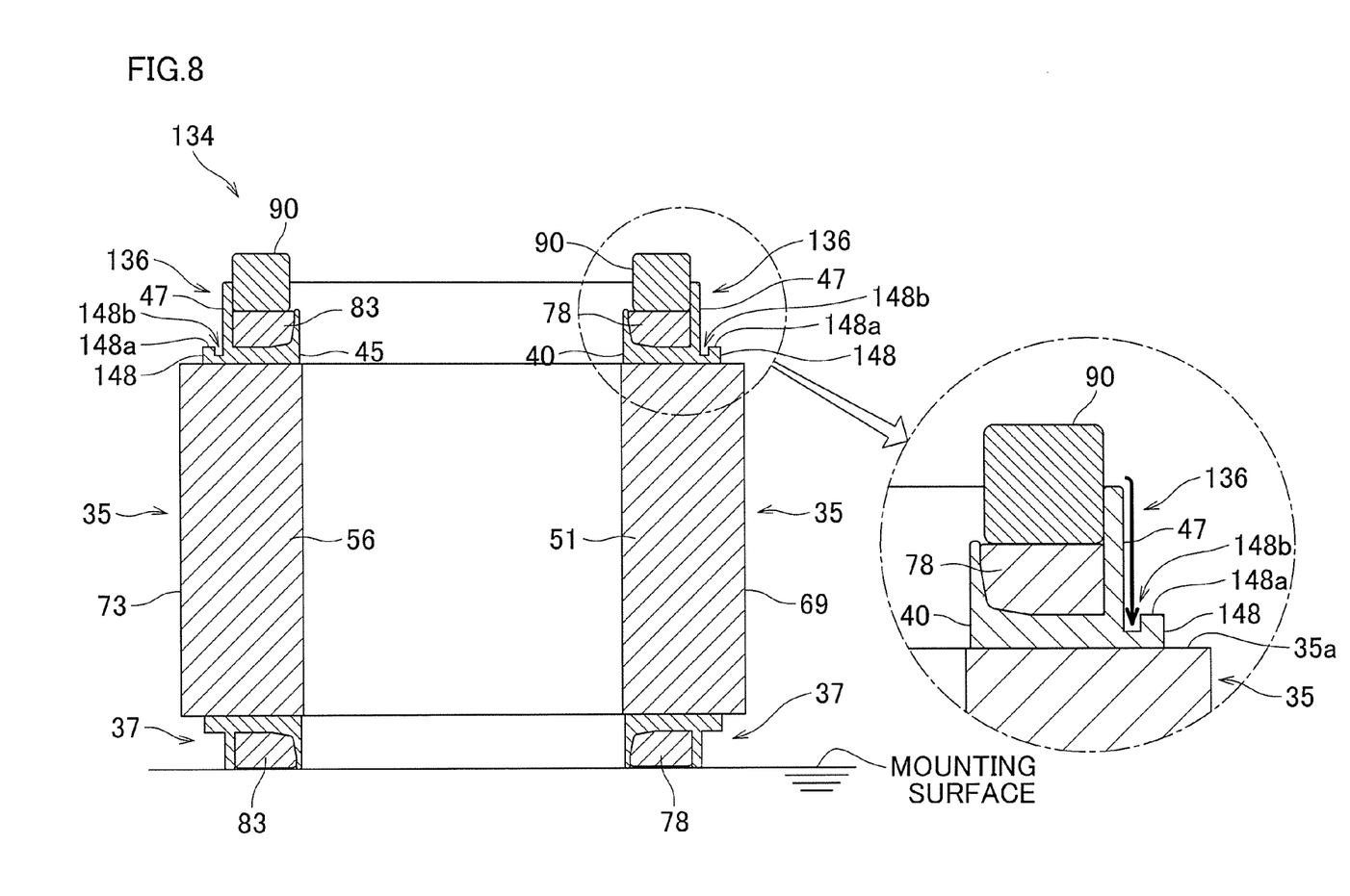
FIG. 8 is an explanatory diagram illustrating the upright position drying process.

The following describes a second embodiment of the stator, motor, and compressor of the present invention. In this embodiment, same components as those described in the first embodiment will be given the same reference numerals, and detailed description thereof will be omitted. FIG. 8 is an explanatory diagram illustrating the upright position drying process.

<Insulator>

As shown in FIG. 8, an insulator 136 of this embodiment differs from that of the above-described first embodiment in that, on a surface 148a of a protrusion 148 (surface on an opposite side of the protrusion 148 from a core 35) corresponding to the protrusion 48 (see FIG. 7) of the insulator 36 of the first embodiment, a groove 148b is formed at a position apart from an outer edge of the protrusion 148.

A bold arrow illustrated in an enlarged view of a portion encircled by an alternate long and short dash line (a portion in the vicinity of a coil 78) in FIG. 8 shows a flow of excess varnish attached to the insulator 136 in the varnishing process. As shown with this arrow, the excess varnish runs via an upper end portion of a wall portion 47 of the insulator 136 and heads toward an end surface 35a of the core 35, however, the excess varnish is pooled in the groove 148b formed on the surface 148a of the protrusion 148, and thereby the flow of the varnish is blocked. Accordingly, the excess varnish fails to reach the end surface 35a of the core 35.

[Characteristics of Compressor of This Embodiment]

The scroll compressor 1 of this embodiment has the following characteristics.

The scroll compressor 1 of this embodiment ensures that excess varnish attached to the insulator 136 is prevented from running down to and attaching to the end surface 35a of the core 35 in the upright position drying process.

(Third Embodiment)

Figure 9:
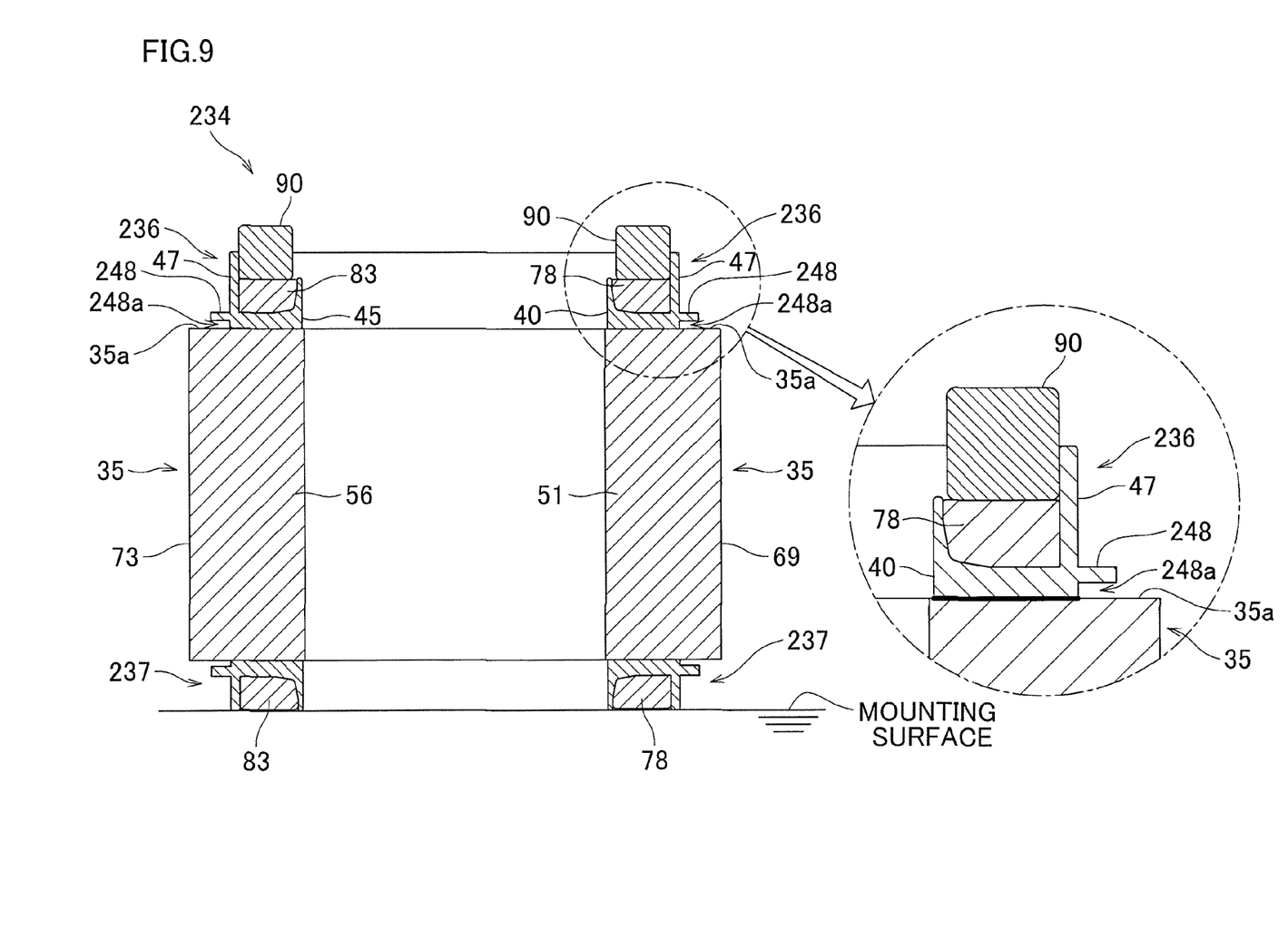
FIG. 9 is an explanatory diagram illustrating the upright position drying process.

The following describes a third embodiment of the stator, motor, and compressor of the present invention. In this embodiment, same components as those described in the first embodiment will be given the same reference numerals, and detailed description thereof will be omitted. FIG. 9 is an explanatory diagram illustrating the upright position drying process.

<Insulator>

As shown in FIG. 9, an insulator 236 of this embodiment differs from that of the above-described first embodiment in that a gap 248a is created across the entire circumference of a protrusion 248, which corresponds to the protrusion 48 (see FIG. 7) of the insulator 36 of the first embodiment, and between the protrusion 248 and an end surface 35a of a core 35; and in that an insulator 237, which corresponds to the insulator 37 (see FIG. 7) of the first embodiment, is formed into a substantially same shape as the insulator 236.

As shown in an enlarged view of a portion encircled by an alternate long and short dash line (a portion in the vicinity of a coil 78) in FIG. 9, the size of an interface area between the insulator 236 and the core 35 (portion indicated with a bold line in the enlarged view) is reduced by the size of the gap 248a created by cutting out a portion between the protrusion 248 of the insulator 236 and the end surface 35a of the core 35. This leads to a decrease in an amount of varnish entering into the interface area in the varnishing process of the stator 234. Accordingly, it is possible to decrease an amount of varnish leaking out of the interface area after a wiping operation of varnish attached to the end surface 35a of the core 35.

Figure 10:
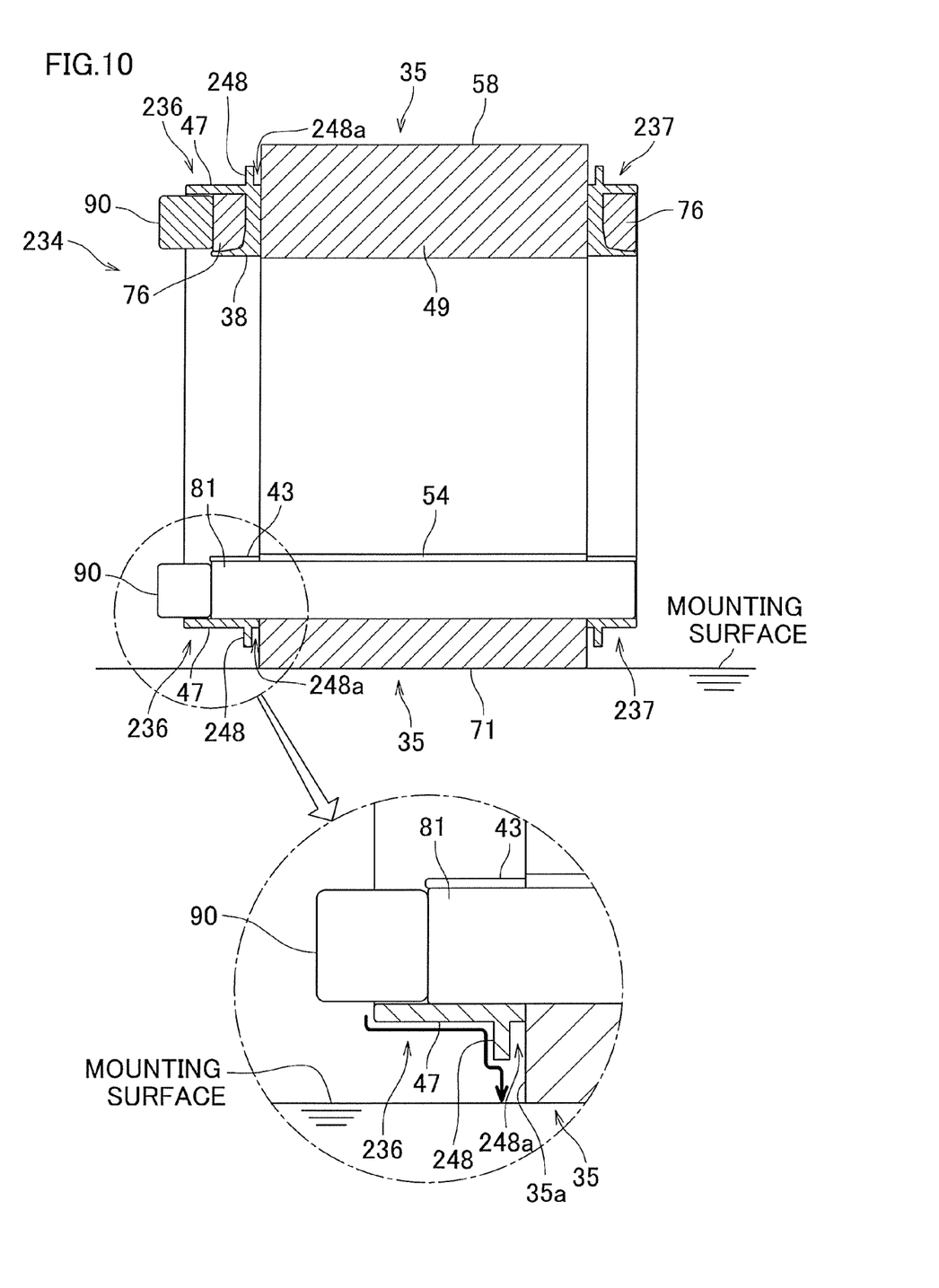
FIG. 10 is an explanatory diagram illustrating a horizontal position drying process.

FIG. 10 is a cross sectional view taken along line B-B shown in FIG. 6, and an explanatory diagram illustrating a horizontal position drying process. A bold arrow illustrated in an enlarged view of a portion encircled by an alternate long and short dash line (a portion in the vicinity of a coil 81) in FIG. 10 shows a flow of excess varnish attached to the insulator 236 in the varnishing process of the stator 234. As shown with this arrow, in the horizontal position drying process, the excess varnish is caused to drop toward a mounting surface from a position spaced apart from the end surface 35a by the size of the gap 248a, and therefore the excess varnish fails to reach the end surface 35a of the core 35. This ensures that the excess varnish is prevented from attaching to the end surface 35a of the core 35.

[Characteristics of Compressor of This Embodiment]

The scroll compressor 1 of this embodiment has the following characteristics.

The scroll compressor 1 of this embodiment provides a decrease in the amount of varnish attached to the end surface 35a of the core 35 in the upright position drying process.

Furthermore, the scroll compressor 1 of this embodiment makes it possible to prevent the stator 234 from losing its balance as a result that, for example, the stator 234 is inclined, in the process of installing the stator 234 into a casing 10 using shrink fitting or the like, and thereby precise positioning of the stator 234 is achieved.

(Fourth Embodiment)

Figure 11:
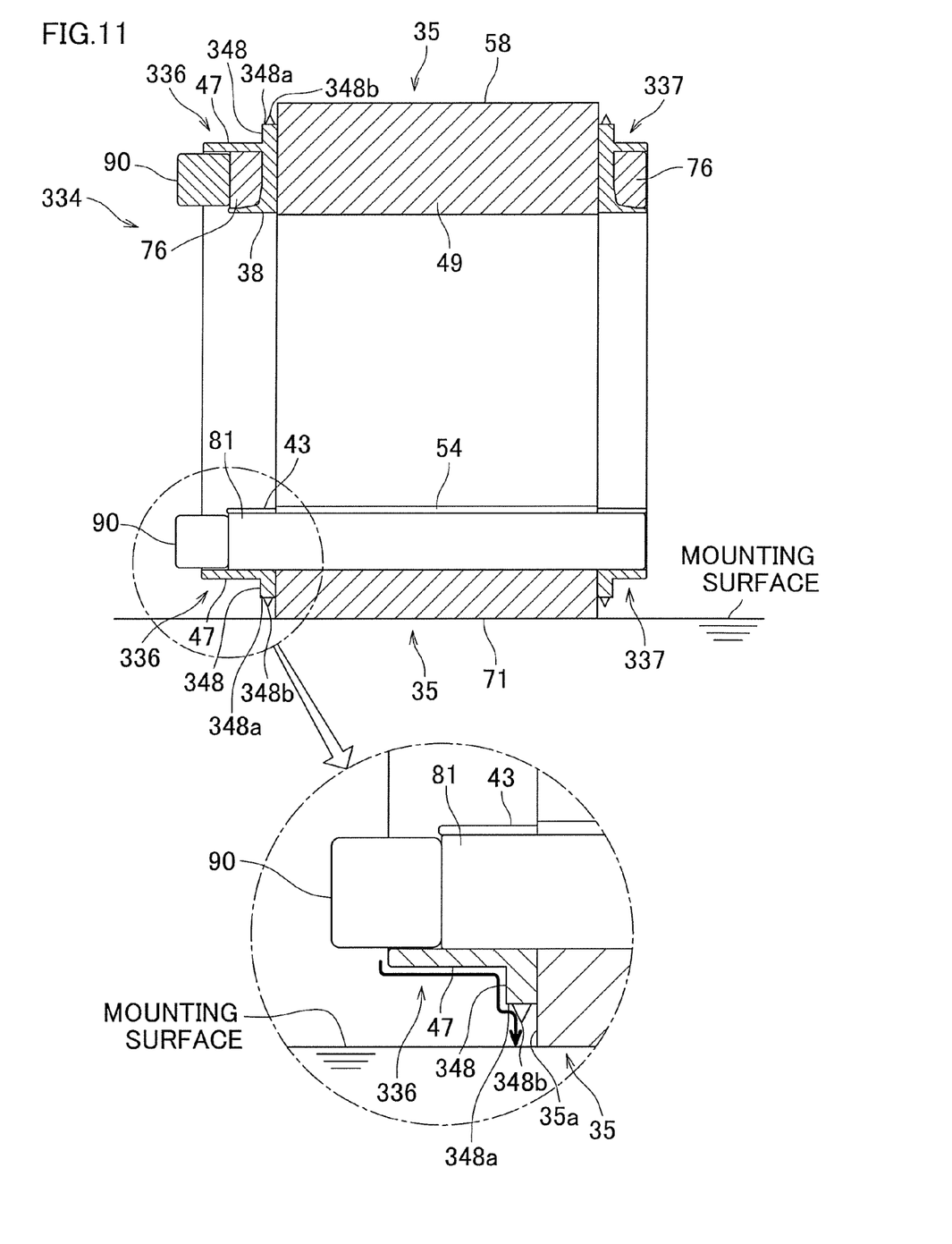
FIG. 11 is an explanatory diagram illustrating the horizontal position drying process.

The following describes a fourth embodiment of the stator, motor, and compressor of the present invention. In this embodiment, same components as those described in the first embodiment will be given the same reference numerals, and detailed description thereof will be omitted. FIG. 11 is a cross sectional view taken along line B-B shown in FIG. 6, and is an explanatory diagram illustrating the horizontal position drying process.

<Insulator>

As shown in FIG. 11, an insulator 336 of this embodiment differs from that of the above-described first embodiment in that a projection 348b protruding radially outward is formed on an edge surface 348a of a protrusion 348 corresponding to the protrusion 48 (see FIG. 7) of the insulator 36 of the first embodiment, and in that an insulator 337 corresponding to the insulator 37 (see FIG. 7) of the first embodiment is formed into a substantially same shape as the insulator 336. The projection 348b is formed so as to have a triangular cross section and is provided across the entire circumference of the edge surface 348a of the protrusion 348. Note that, as a substitute for the projection 348b, it is possible to use a portion where mold parts match up (parting line) which is formed across the entire circumference of the insulator 336 when the insulator 336 is molded.

A bold arrow illustrated in an enlarged view of a portion encircled by an alternate long and short dash line (a portion in the vicinity of a coil 81) in FIG. 11 shows a flow of excess varnish attached to the insulator 336 in the varnishing process of a stator 334. As shown with this arrow, the excess varnish is caused to drop toward a mounting surface through the projection 348b located before an end surface 35a of a core 35. Therefore, the excess varnish fails to reach the end surface 35a of the core 35. Accordingly, it is ensured that the excess varnish is prevented from attaching to the end surface 35a of the core 35.

[Characteristics of Compressor of This Embodiment]

The scroll compressor 1 of this embodiment has the following characteristics.

The scroll compressor 1 of this embodiment makes it possible to prevent the stator 334 from losing its balance in the process of installing the stator 334 into a casing 10 using shrink fitting or the like, and thereby precise positioning of the stator 334 is achieved.

The foregoing has described the embodiments of the present invention with reference to the drawings. It should be understood that specific structures of the invention are not limited to these embodiments. The scope of the present invention is described, not only by the description of the above embodiments, but by the appended claims, and shall encompass various modifications within the scope of the claims and those which are equivalent to the claims.

The above-described third embodiment deals with the example in which a projection 248b is not provided on an edge surface of the protrusion 248 (see FIG. 10), however, the present invention is not limited to this embodiment. For example, as shown in FIG. 12, the projection 248b protruding radially outward may be provided on the edge surface of the protrusion 248.

Figure 12:
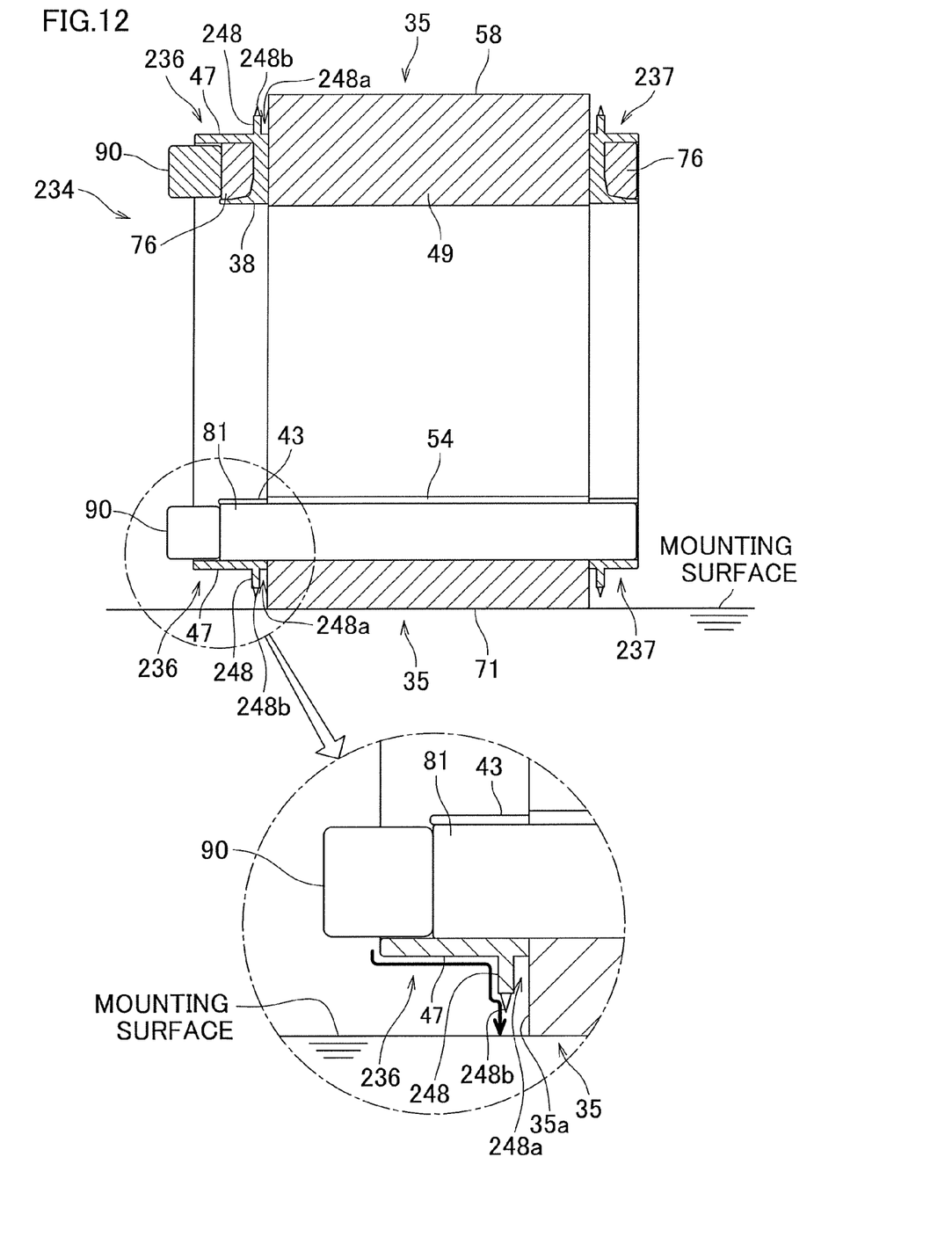
FIG. 12 is an explanatory diagram illustrating the horizontal position drying process.

In this structure, as indicated with a bold arrow illustrated in an enlarged view of a portion encircled by an alternate long and short dash line (portion in the vicinity of the coil 81) in FIG. 12, in the horizontal position drying process, excess varnish attached to the insulator 236 is caused to drop toward the mounting surface through the projection 248b located before the end surface 35a of the core 35. This further ensures that the excess varnish is prevented from attaching to the end surface 35a of the core 35. In addition, as shown in FIG. 12, the insulator 237 may be formed into a substantially same shape as the insulator 236.

The above-described third embodiment deals with the example in which the gap 248a is created across the entire circumference of the protrusion 248 and between the protrusion 248 and the end portion of the core 35 (see FIGS. 9 and 10), however, such a gap may be created at an arbitrary position in a part of the protrusion 248. To be more specific, such gaps may be created only at positions corresponding to the bulging portions 67 to 75 (see FIG. 6) formed on the outer circumference of the core 35.

This structure allows, in the horizontal position drying process (see FIG. 10), excess varnish attached to the insulator 236 to drop from a position before the bulging portion 71 toward the mounting surface before the varnish reaches the bulging portion 71. This ensures that the excess varnish is prevented from attaching to the bulging portion 71, which contacts the inner circumferential surface of the casing 10 when the stator 234 is installed into the casing 10.

The above-described fourth embodiment deals with the example in which the projection 348b is provided across the entire circumference of the edge surface 348a of the protrusion 348, however, the present invention is not limited to this embodiment. Such a projection 348b may be provided on a part of the edge surface 348a.

The above-described fourth embodiment deals with the example in which the projection 348b is formed so as to have a triangular cross section, however, the present invention is not limited to this embodiment. Such a projection 348b may be formed so as to have a quadrangular cross section or the like.

The above-described first to fourth embodiments each deals with the example in which the stator and the motor of the present invention are applied to the scroll compressor, however, the present invention is not limited to these embodiments. For example, the stator and the motor of the present invention are applicable to a rotary compressor which compresses a refrigerant introduced from an accumulator and then discharges the compressed refrigerant, and the like.

Industrial Applicability

The present invention provides a stator, a motor, and a compressor each of which is capable of achieving precise positioning of the stator in the process of installing the stator into a casing.

What is claimed is:

1. A stator comprising:
a core having a plurality of annularly arranged tooth portions; and an insulator disposed on an end portion of the core, the insulator having an annular wall portion extending in a direction departing from the core, with a protrusion protruding radially outward across an entire circumference of the wall portion, and the protrusion being provided on an outer circumferential surface of the wall portion, the core having recesses formed along an axial direction thereof at respective portions of an outer circumferential surface of the core which correspond to the plurality of tooth portions, and the protrusion being arranged so that gaps are created at respective positions corresponding to portions between the tooth portions, each of the gaps is situated between a part of the protrusion and the end portion of the core, and the gaps are formed to extend around at least a majority of a circumference of the core.

2. The stator according to claim 1, wherein
at least a part of a surface of the protrusion has a groove formed thereon at a position apart from an outer edge of the protrusion, with the surface of the protrusion being on an opposite side of the protrusion from the core.

3. A motor comprising:
the stator according to claim 2; and
a rotor disposed inside the core.

4. A compressor comprising the motor according to claim 3.

5. A motor comprising:
the stator according to Claim 1; and
a rotor disposed inside the core.

6. A compressor comprising the motor according to claim 5.

7. The stator according to claim 1, wherein
an edge surface of the protrusion has a projection protruding radially outward formed thereon.

8. The stator according to claim 7, wherein
the projection is a parting line formed across an entire circumference of the edge surface of the protrusion.

9. A stator comprising:
a core having a plurality of annularly arranged tooth portions; and
an insulator disposed on an end portion of the core, the insulator having an annular wall portion extending in a direction departing from the core,
with a protrusion protruding radially outward across an entire circumference of the wall portion, and the protrusion being provided on an outer circumferential surface of the wall portion,
a radially outermost edge surface of the protrusion having a projection protruding radially outward formed thereon with a gap interposed between the projection and the end portion of the core, the radially outermost edge surface being disposed radially outward of the wall portion, and
the gap being defined by an axial end surface of the core, a surface of the projection facing the axial end surface, a surface of the protrusion facing the axial end surface and an outer circumferential surface of the wall surface from which the protrusion protrudes.

10. The stator according to claim 9, wherein
the projection is a parting line formed across an entire circumference of the edge surface of the protrusion.

11. The stator according to claim 9, wherein
the protrusion is arranged so that a gap is created between at least a part of the protrusion and the end portion of the core.

12. The stator according to claim 11, wherein
the protrusion is arranged so that a gap is created across an entire circumference of the protrusion and between the protrusion and the end portion of the core.

13. The stator according to claim 11, wherein
the core has recesses formed along an axial direction thereof at respective portions of an outer circumferential surface of the core which correspond to the plurality of tooth portions; and
the protrusion is arranged so that gaps are created at respective positions corresponding to portions between the tooth portions, and each of the gaps is situated between a part of the protrusion and the end portion of the core.

14. A motor comprising:
the stator according to claim 9; and
a rotor disposed inside the core.

15. A compressor comprising the motor according to claim 14.

16. A stator comprising:
a core having a plurality of annularly arranged tooth portions; and
an insulator disposed on an end portion of the core, the insulator having an annular wall portion extending in a direction departing from the core,
with a protrusion protruding radially outward across an entire circumference of the wall portion, and the protrusion being provided on an outer circumferential surface of the wall portion,
the core having recesses formed along an axial direction thereof at respective portions of an outer circumferential surface of the core which correspond to the plurality of tooth portions, and
the protrusion being arranged so that a gap is created between the protrusion and the end portion of the core, and the gap is formed to extend around an entire circumference of the core.

17. The stator according to claim 16, wherein
an edge surface of the protrusion has a projection protruding radially outward formed thereon.

18. The stator according to claim 17, wherein
the projection is a parting line formed across an entire circumference of the edge surface of the protrusion.

19. A motor comprising: the stator according to claim 16; and a rotor disposed inside the core.

20. A compressor including the motor according to claim 19.

* * * * *